April 19, 1927.
A. F. VICTOR
1,625,065
INTERMITTENT FILM FEED
Filed Dec. 10, 1923    2 Sheets-Sheet 1
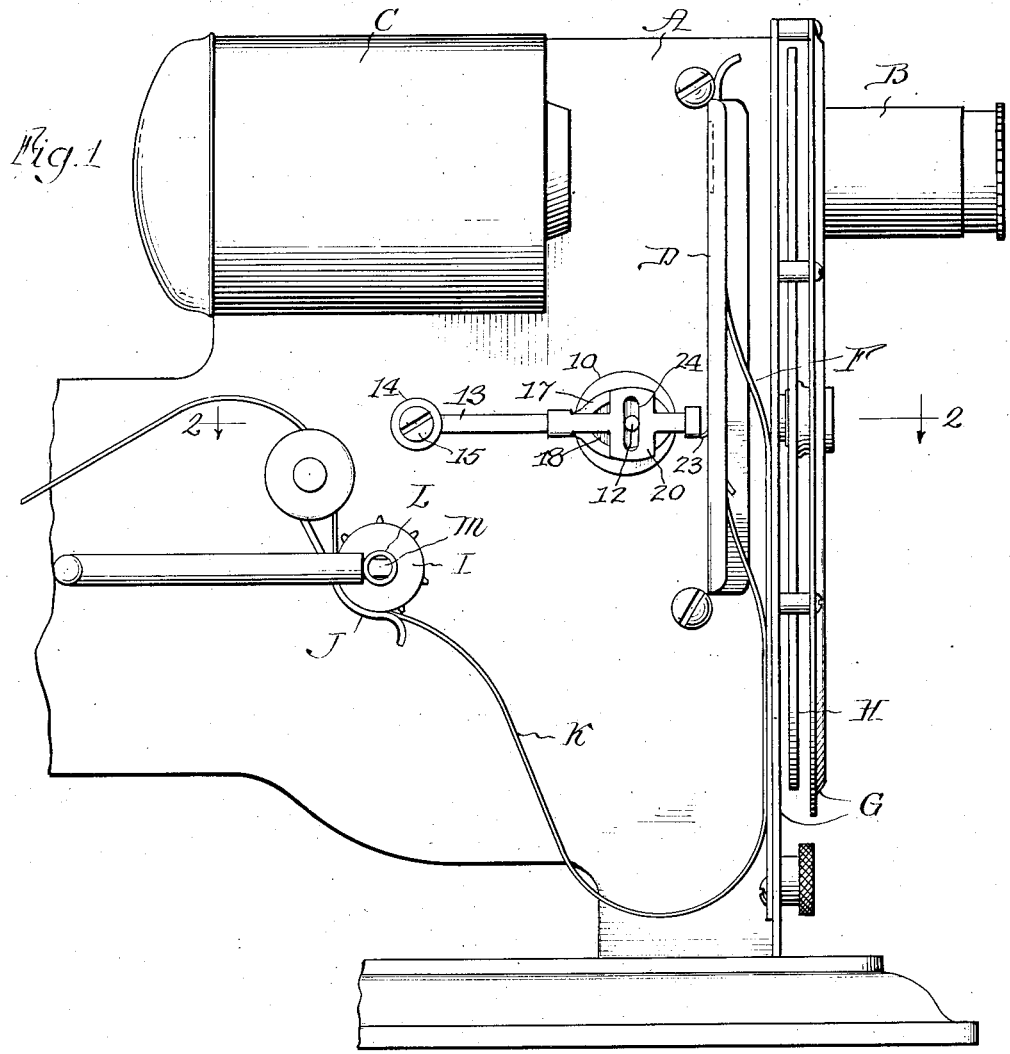
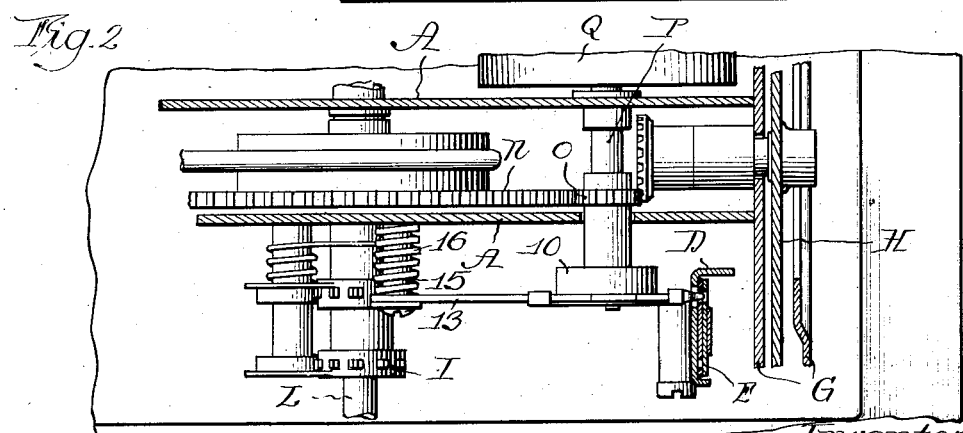

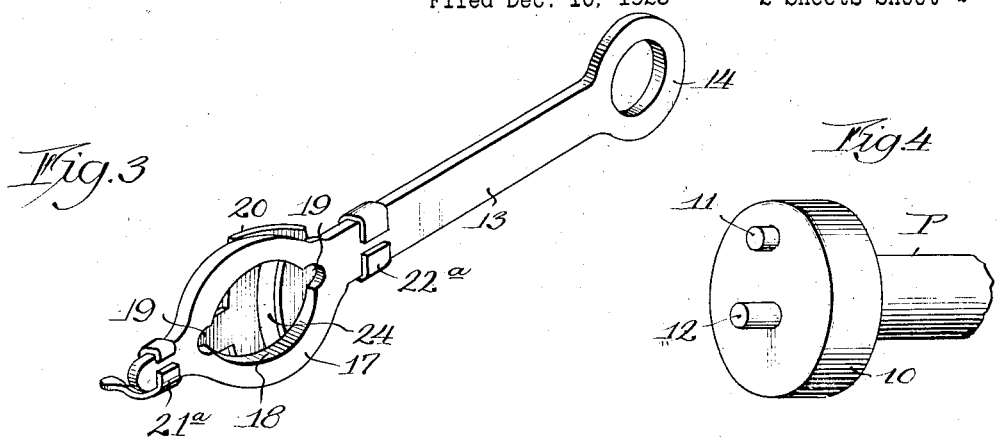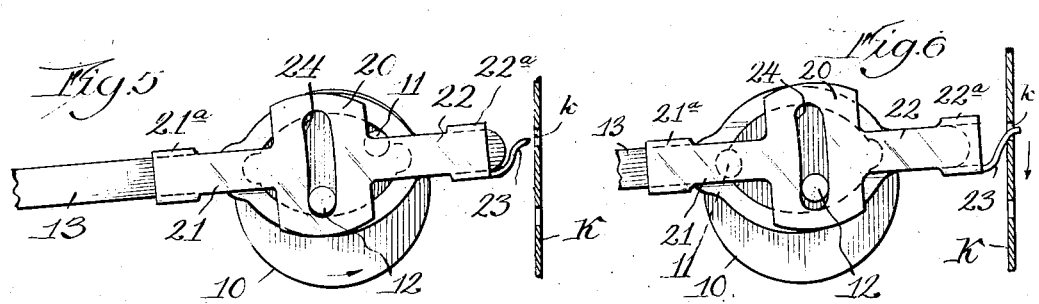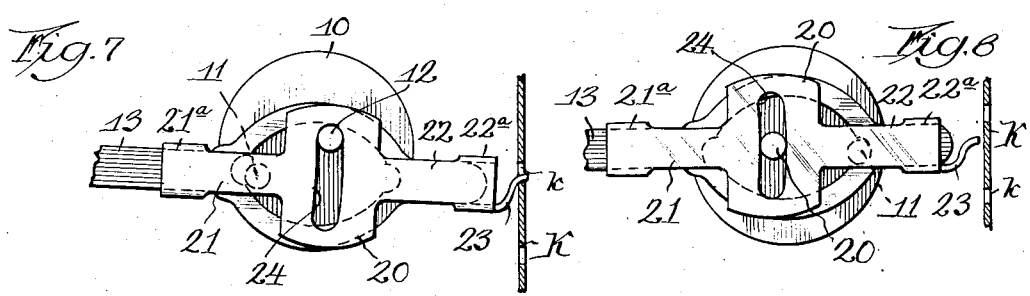

Patented Apr. 19, 1927.

1,625,065

UNITED STATES PATENT OFFICE.

ALEXANDER FERDINAND VICTOR, OF DAVENPORT, IOWA.

INTERMITTENT-FILM FEED.

Application filed December 10, 1923. Serial No. 679,798.

My invention relates to means for intermittently moving film in cinematographic machines, and, while the structure is illustrated in conjunction with a projecting apparatus, it is well adapted for use with other structures wherein it is desired to move the film in an intermittent manner.

Among the objects of my invention are the provision of a film moving mechanism that is extremely simple in construction and is dependable in performing the functions for which it is designed. Other objects reside in providing a film feed mechanism of the intermittent type that has a minimum of parts and which may be readily made by stamping the same out of metal sheets, thereby materially reducing the expense and time incident to the producing and assembly of the finished device. Further objects and advantages will be apparent to others skilled in the art after an understanding of my invention is had.

I prefer to carry out my invention in substantially the following manner, reference being made to the accompanying drawings that form a part hereof.

In the drawings:—

Figure 1 is a fragmentary view of the forward portion of the projecting apparatus showing my film feeding mechanism incorporated therewith.

Fig. 2 is a horizontal transverse section thereof taken on line 2—2 of Figure 1.

Figure 3 is a perspective of the film feeding arm detached from the apparatus and drawn to an exaggerated scale.

Fig. 4 is a perspective of the cam-disk for actuating the structure shown in Figure 3.

Fig. 5 is a fragmentary, somewhat diagrammatic view showing the initial position of the feed mechanism prior to the engagement with the film.

Fig. 6 is a view of the same parts showing their relative positions after the film has been engaged.

Fig. 7 is another view of the same parts showing their relative positions after the film has been moved downward one step to expose another picture.

Fig. 8 is a view of the same parts showing the relative positions after the withdrawal from the film and the feeding mechanism at an intermediate position during the return movement to the first position shown in Fig. 5.

For the purpose of convenience in illustrating the application of my invention to a suitable cinematographic machine, I have shown the feeding mechanism in conjunction with a portion of a portable moving-picture apparatus. As seen in the drawings, the projector structure comprises vertically disposed spaced walls forming an upright support A upon which is mounted the focalizing lens tube B back of which is a lamp house C and intermediate the lens tube and lamp house is the framing device and film guide which consists of a stationary channeled plate D having the usual picture aperture therein and against which is positioned a presser plate E that is yieldingly engaged by an elongated spring. Two spaced disks G are mounted at the front of the support A transversely to the plane thereof and between these disks is rotatably mounted the shutter H that is actuated by suitable gearing that derive their motion from the drive mechanism. The usual guide sprocket I with presser plate J is mounted upon the frame A over which the film K passes after it has been moved through the apparatus between the plates of the framing guide. This sprocket is mounted upon and fixed to the drive shaft L that has a transverse slot M in its outer end to receive the actuating handle or crank, not shown. A large gear N is fixedly mounted upon the drive shaft L preferably between the walls of the support A and is in mesh with a pinion O mounted upon a spindle P that extends through said support and has a balance wheel G upon one end and a cam-disk 10 upon its opposite end, both of which are outside the walls of the support.

Cam-disk 10 carries upon its outer face two pins, 11 and 12, the former being shorter than the latter and being disposed further from the axis of rotation of the disk than the pin 12. These pins are both eccentric to the axis of rotation of the disk 10, and during the movement of the latter are adapted to actuate the film feeding structure which will now be described.

This film feeding structure, as seen in the drawings, comprises a pivoted elongated arm 13, one end thereof being provided with an eye 14 to receive the end of a stud 15 projecting from the adjacent wall of the support A, and said stud 15, between the support and the eye of said arm, is surrounded by a coiled expansion spring 16 which exerts a slight pressure against the arm to prevent too free movement thereof, and the head of a screw maintains said arm in assembly with the stud. The opposite end of the arm 13 is enlarged as at 17 and has an oval shaped recess or aperture 18 formed therein, the major axis of which is parallel with or extends longitudinally of the arm 13. This aperture or recess 18 has its upper and lower portions formed from the upper and lower segments of a circle that is described by the eccentric pin 11 on the disk 10, but, as will be seen, these segments have been moved towards each other so as to construct the oval or elliptical recess as shown. At the ends of the major axis of this recess are offset portions 19, the remote edges of which are a distance apart equal to the diameter of the circle described by the pin 11 so that when said pin is rotated in the aperture 18 and the pin reaches an approximate horizontal position with respect to the axis of rotation of the disk 10, said pin will then be positioned in either one or the other of said offset portions 19 and further rotation of the disk will move the arm up or down depending upon the direction of rotation of the disk and the respective offset portion 19 with which the pin is engaged. This oscillation of the arm 13 in a vertical direction corresponds to the desired movement of the film, and will move one picture past the aperture in the film guide and will position the next picture in registry therewith. The arm will move at its outer end in an arc of a circle struck from the center of the eye 14 but it would not necessarily engage with the perforation in the film throughout its oscillation unless it has been moved bodily in a longitudinal direction. In order to engage the film during the downward movement and disengage the film during the upward movement, I have provided a sliding structure that is carried upon the adjacent portion of the arm and which moves longitudinally thereof at the end of each oscillation of said arm.

The movable structure above mentioned comprises a plate 20 having oppositely projecting extensions 21 and 22 that lie alongside of the adjacent portions of the arm 13, and at their respective ends are provided with transverse loops 21ª and 22ª that surround the straight portions of the arm 13 upon opposite sides of the enlarged portion 17 in which the oval shaped aperture is provided. These loops are of such construction and are so formed that they permit of a sliding reciprocating movement of the plate 20 upon the arm 13. The loop 22ª is provided with a forwardly extending finger 23 that projects beyond the end of the arm 13 to a point adjacent the film so that when said plate is slid forward or toward the end of the arm 13 said finger will engage with one of the perforations $k$ in the film. Extending across the plate 20, transverse to the plane of the extensions 21 and 22, is a slot 24 into which the longer eccentric pin 12 projects. It will be noted that the plate is positioned against the side of the arm opposite the disk 10, and the pin 11 is of a length equal to the thickness of the metal of arm 13 so that said pin will not project beyond the opposite face of the latter and in any way engage or interfere with the reciprocating movement of the plate 20. Pin 12, however, being longer than pin 11 engages the slot 24 in the plate and moves the latter longitudinally upon the arm 13 at the proper time to engage the finger 23 with the film, but as its circular path of movement is of less diameter than the minor or short axis of the aperture 18 it will not interfere with the oscillating movement of the arm 13.

The structure is so timed that when the arm is in the position shown in Figure 5 and the disk is revolving anti-clockwise, the arm will be stationary while the pin 11 is engaging the upper segment of the aperture 18, and the pin 12 will then be moving the plate toward the end of the arm so as to engage the finger 23 with the adjacent perforation in the film. When the pin 11 has reached the offset portion 19 farthest from the end of the arm it will begin to move the arm downward as indicated in Figures 6 and 7 thus causing the film to be moved downward the height of one picture. The pin 11 then moves out of or past the offset portion as seen in Figure 7 and begins its movement against the lower segment of the aperture 18 in the arm, and the pin 12 begins to reciprocate the plate in the opposite direction to withdraw the finger 23 from the perforation. When pin 11 reaches the off-set 19 nearest the end of the arm 13 the latter will be moved upwardly to the first position while finger 23 is in its withdrawn position out of engagement with film.

It will be seen from the foregoing that I have provided a structure for feeding film step-by-step, the cycle of operation of which is so timed that the period of rest or non-movement of the film is considerably greater than the period of motion. By referring to Figures 5 to 8 it will be observed the film is at rest and may be exposed or the picture projected during approximately five-sixths of a revolution of the cam-disk 10, whereas the period of movement is during the short time the pin 11 is engaged with the off-set portion 19 of the aperture that is farthest from the film. In other words, the film remains at rest while the pin 11 traverses its path in engagement with both the lower and upper edges of the elongated aperture 18 the arms 13 is stationary and when said pin engages with the off-set portion 19 nearest the film the film-engaging finger 23 is withdrawn from the film perforation while the arm and slide are being moved to their upper position prior to the next engagement of the film. Also, it will be noted that the period of film motion is very rapid and of short duration due to the fact that the off-set which is engaged by the pin 11 during the film moving period of the cycle is nearest the fulcrum of the arm 13 and the film end of the arm will be moved quicker while the other off-set being farthest from this fulcrum such movement, as the pin imparts to the arm when engaged in the latter off-set, is necessarily much slower.

What I claim is:—

1. Film feeding mechanism comprising an elongated oscillating member, an element movable therewith and reciprocable longitudinally on said member to and from the film, a rotatable disk, and a plurality of eccentrically disposed pins projecting from the face of said disk and engaged respectively with said member and said element for independently actuating the same.

2. Film feeding mechanism comprising an oscillating member, an element carried thereby and reciprocable thereon to and from the film, a rotatable disk, and a plurality of eccentrically disposed pins projecting from the face of said disk and engaged respectively with said member and said element to cause the latter to engage, move and disengage the film.

3. Film feeding mechanism comprising an arm pivoted at one end and extending towards the film, a sliding plate carried by said arm and reciprocable to and from the film, a rotatable disk, and eccentrically disposed pins on the face of said disk one of which engages and oscillates said arm, and the other of which engages and reciprocates said plate longitudinally on said arm.

4. Film feeding mechanism comprising an apertured arm pivoted at one end and extending towards the film, a slotted plate slidably carried by said arm and reciprocable thereon to and from the film, a rotatable disk, and eccentric pins on the face of said disk one of said pins engaging the aperture in said arm and oscillates the arm and the other of said pin engaging the slot in said plate and reciprocates the plate longitudinally on said arm.

5. Film feeding mechanism comprising an apertured arm pivoted at one end and extending towards the film, a slotted plate carried by said arm and reciprocable to and from the film, a rotatable disk, an eccentric pin projecting from the face of the disk adjacent its periphery and entering in the aperture of said arm to oscillate the latter, and an eccentric pin adjacent the axis of said disk and entering the slot in said plate to reciprocate the latter upon said arm into and out of engagement with the film.

6. In film feeding mechanism, a pivoted arm having an elliptical aperture therein that has recesses at opposite ends of its major axis, a crank pin co-acting with said aperture and adapted to oscillate said arm when engaged with a recess, an element mounted on said arm and movable to and from the film, and means for moving said element at the end of each movement of the arm.

7. Film feeding mechanism comprising a pivoted arm having an aperture therein, the upper and lower edges of which are segmental in shape and the longitudinal ends of said aperture are provided with recesses, a crank pin co-acting with the aperture in said arm whereby during its engagement with the segmental portions thereof said arm remains stationary and when engaged with a recess will move said arm upon its pivot, and a device actuated by said arm adapted to intermittently engage the film.

8. Film feeding mechanism comprising an arm pivoted at one end and having its opposite ends oscillated in the direction of movement of the film, a slide mounted upon the outer end of said arm supported solely thereon and guided solely thereby, said slide having a film engaging member at its outer end and means for causing independent movements of said arm and slide whereby to cause said member to engage, move and disengage the film.

9. Film feeding mechanism comprising a pivoted arm, having an elliptical aperture adjacent one end, and a rotatable crank-pin coacting with said aperture to oscillate said arm, the longitudinal edges of said aperture being segments of the path described by said pin during its rotation, there being recesses at the ends of the major axis of and communicating with the aperture.

Signed at Davenport, county of Scott and State of Iowa, this 6th day of December, 1923.

ALEXANDER FERDINAND VICTOR.